(12) United States Patent
Rimchala

(10) Patent No.: US 11,837,002 B2
(45) Date of Patent: Dec. 5, 2023

(54) SYSTEM AND METHOD FOR SPATIAL ENCODING AND FEATURE GENERATORS FOR ENHANCING INFORMATION EXTRACTION

(71) Applicant: INTUIT INC., Mountain View, CA (US)

(72) Inventor: Tharathorn Rimchala, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 226 days.

(21) Appl. No.: 16/265,505

(22) Filed: Feb. 1, 2019

(65) Prior Publication Data
US 2020/0250263 A1 Aug. 6, 2020

(51) Int. Cl.
| | |
|---|---|
| G06V 30/40 | (2022.01) |
| G06F 40/284 | (2020.01) |
| G06N 20/00 | (2019.01) |
| G06F 40/149 | (2020.01) |
| G06N 3/02 | (2006.01) |
| G06V 30/242 | (2022.01) |

(52) U.S. Cl.
CPC ............ *G06V 30/40* (2022.01); *G06F 40/149* (2020.01); *G06F 40/284* (2020.01); *G06N 3/02* (2013.01); *G06N 20/00* (2019.01); *G06V 30/242* (2022.01)

(58) Field of Classification Search
CPC .... G06F 40/284; G06K 9/00442; G06N 3/02; G06N 20/00
See application file for complete search history.

(56) References Cited

U.S. PATENT DOCUMENTS

| | | | | |
|---|---|---|---|---|
| 10,713,597 | B2 * | 7/2020 | Copper | G06F 16/22 |
| 2017/0300565 | A1 * | 10/2017 | Calapodescu | G06F 16/353 |
| 2018/0203836 | A1 * | 7/2018 | Singh | G06F 40/18 |
| 2019/0065911 | A1 * | 2/2019 | Lee | G06K 9/46 |
| 2020/0004736 | A1 * | 1/2020 | Liu | G06F 16/81 |
| 2020/0184423 | A1 * | 6/2020 | McEnroe | G06F 40/205 |

FOREIGN PATENT DOCUMENTS

WO WO 2019/023412 1/2019

OTHER PUBLICATIONS

International Search Report issued in PCT/US2019/043778 dated Oct. 31, 2019.
Written Opinion issued in PCT/US2019/043778 dated Oct. 31, 2019.
J. Baek, "Fast Document Rectification and Enhancement", Dropbox, Aug. 16, 2016, 11 pages.
C. Dong et al., "Character-Based LSTM-CRF with Radical-Level Features for Chinese Named Entity Recognition", NLPCC-ICCPOL, 2016, pp. 239-250.
Z. Huang et al., "Bidirectional LSTM-CRF Models for Sequence Tagging", arXiv:1508.01991v1, Aug. 9, 2015, 10 pages.

(Continued)

*Primary Examiner* — Thomas H Maung
(74) *Attorney, Agent, or Firm* — DLA PIPER LLP (US)

(57) ABSTRACT

A system and method for extracting data from a piece of content using spatial information about the piece of content. The system and method may use a conditional random fields process or a bidirectional long short term memory and conditional random fields process to extract structured data using the spatial information.

18 Claims, 12 Drawing Sheets

(56) References Cited

OTHER PUBLICATIONS

D. Kingma et al., "ADAM: A Method for Stochastic Optimization", arXiv:1412.6980v9, Jan. 30, 2017, 15 pages.
B. Lin et al., "Multi-Channel BiISTM-CRF Model for Emerging Named Entity Recognition in Social Media", Proceedings of the 3rd Annual Workshop on Noisy User-Generated Text, Sep. 7, 2017, pp. 160-165.
A. Newell et al., "Stacked Hourglass Networks for Human Pose Estimation", arXiv:1603.06937v2, Jul. 26, 2016, 17 pages.
Y. Pai et al., "Adaptive Thresholding Algoritm: Efficient Computation Technique Based on Intelligent Block Detection for Degraded Document Images", Pattern Recognition, vol. 43, Issue 9, Sep. 10, 2010, pp. 3177-3187.
Sauvola et al., "Adaptive Document Image Binarization", Patter Recognition vol. 33, (2000), pp. 225-236.
Y. Xiong, "Fast and Accurate Document Detection for Scanning", Dropbox, Aug. 9, 2016, 9 pages.

\* cited by examiner

FIG. 2

- Original
- Whole Image Dimension (a)
- Patch/Cell order (b)
- Paragraph order (c)
- Line order (d) + Bounding box (e)
- Word order (f) + Bounding box (g)
- Entity Label

FIG. 7A

Original§a§b§c§d§e§f§g§Label

FIG. 7B

SYSTEM AND METHOD FOR SPATIAL ENCODING AND FEATURE GENERATORS FOR ENHANCING INFORMATION EXTRACTION

BRIEF DESCRIPTION OF THE FIGURES

FIG. 2 illustrates an example of a piece of content from which data may be extracted using the document understanding process.

FIGS. 7A and 7B illustrates an example of the encoding of the spatial information for the piece of content and the feature token with the spatial information, respectively.

DETAILED DESCRIPTION OF SEVERAL EMBODIMENTS

Today, people receive many different pieces of content from many sources (e.g., PDF files, mobile document images, etc.) and it is desirable to be able to derive structured data from the different documents in a process known as document understanding. The structured data may be used in various downstream processes, such as tax calculations, tax return preparations, accounting and any other process in which it is desirable to be able to insert structured data into a database or to provide the structured data to various downstream processes.

Figure 1:
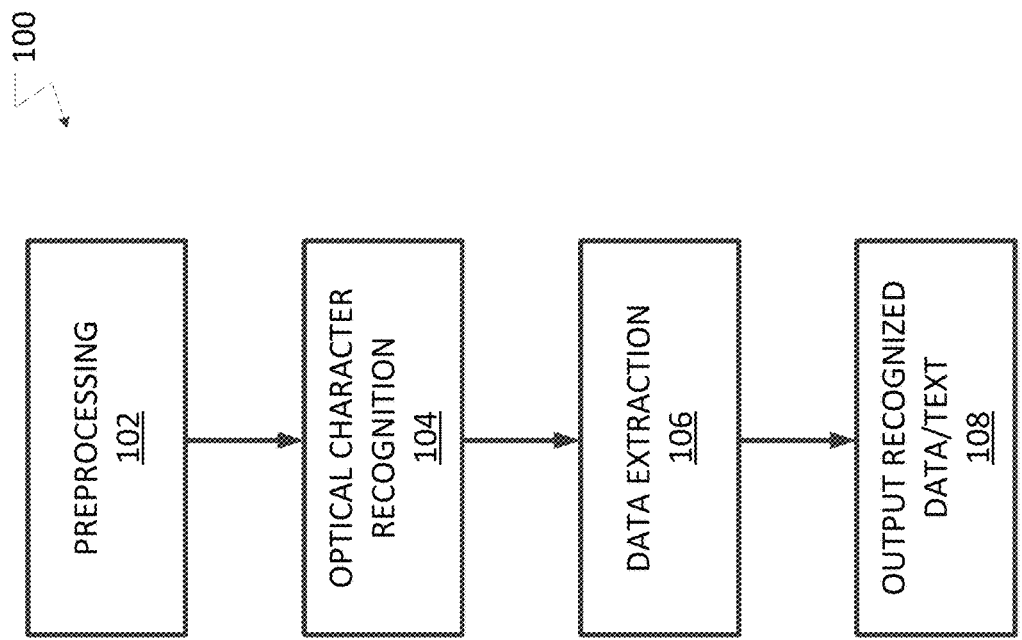
FIG. 1 illustrates a document understanding process.

FIG. 1 illustrates a document understanding process 100 that may include an information extraction process. While method 100 is disclosed as particularly being applicable to an image of a piece of content and the piece of content may be a receipt/invoice or a tax form, the method may be used to understand the contents of any type of document or piece of content in which it is desirable to be able to extract structured data from the piece of content. During the document understanding method, a preprocessing 102 may be performed in which an image of the incoming piece of content may be analyzed and processed to improves the later extraction of information from the piece of content. For example, the preprocessing may include contrast enhancement of the image of the piece of content, cropping of the image of the piece of content and skew rectification of the image of the piece of content. The method 100 may perform an optical character recognition process (104) in which the information and alphanumeric characters in the piece of content are recognized. The method 100 may use any known or yet to be developed optical character recognition process (including using commercially available optical character recognition products). The optical character recognition process 104 may generate various information and data about the piece of content including information about a structure of the piece of content and information about the alphanumeric characters that appear in the piece of content. For example, for a receipt, the optical character recognition process may generate data about the location of certain alphanumeric characters, bounding boxes for certain alphanumeric characters and values for each of the alphanumeric characters that appear in the receipt. The information and data about the piece of content from the optical character recognition process may be noisy in that it contains errors that make the information and data about the piece of content from the optical character recognition process unsatisfactory for use in other data processing methods and techniques.

The various information and data about the piece of content from the optical character recognition process may be input into a data extraction process 106 in which extracted digital data corresponding to the piece of content is generated and output (108). The extracted digital data may be "cleaned" in that various processes are used to clean up the "noisy" information and data about the piece of content. For example, the data extraction process may include a process of machine learning based information extraction with empty patch detection and spatial information and encoding that extracts the structured data from the piece of content that is described in more detail below.

Figure 2:
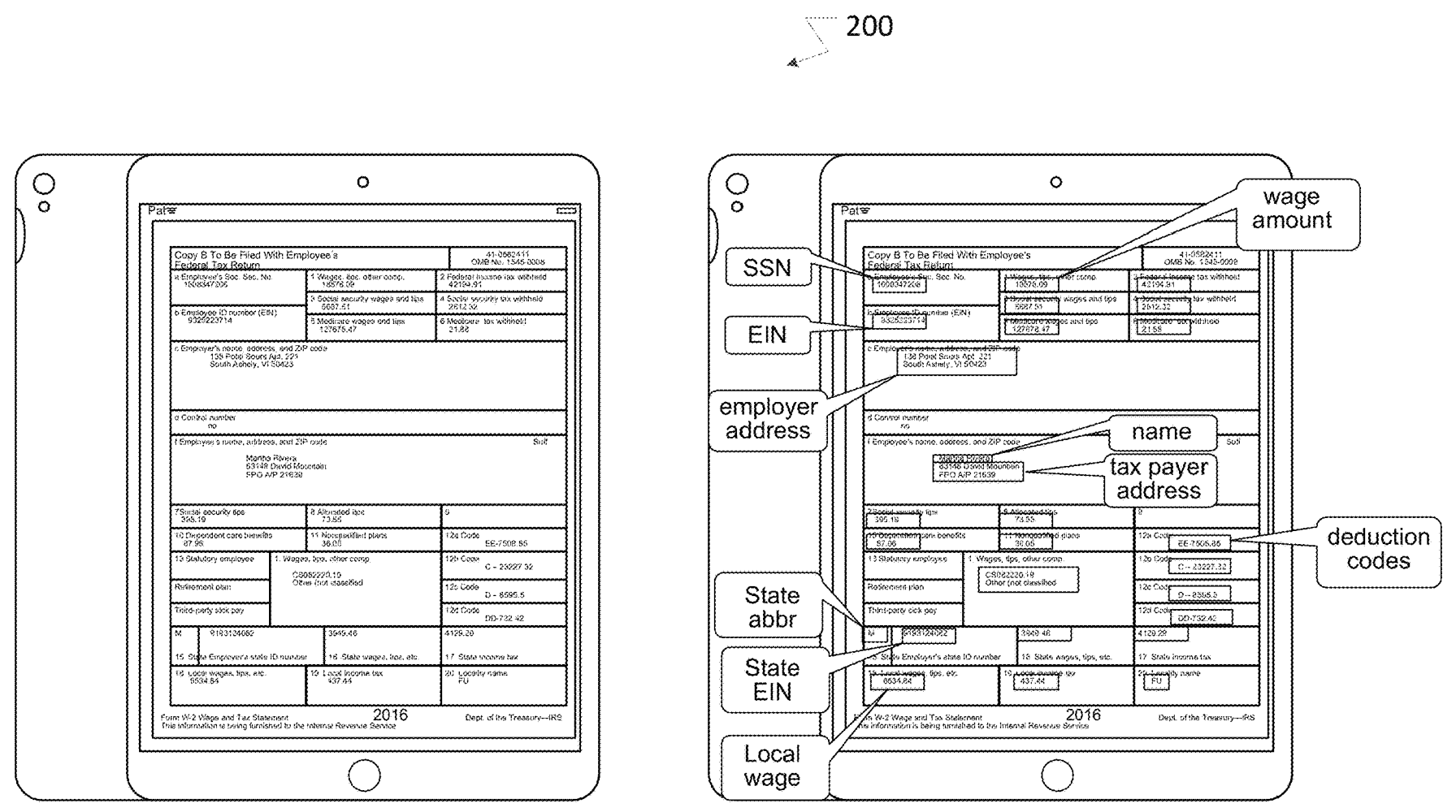
Figure 10:
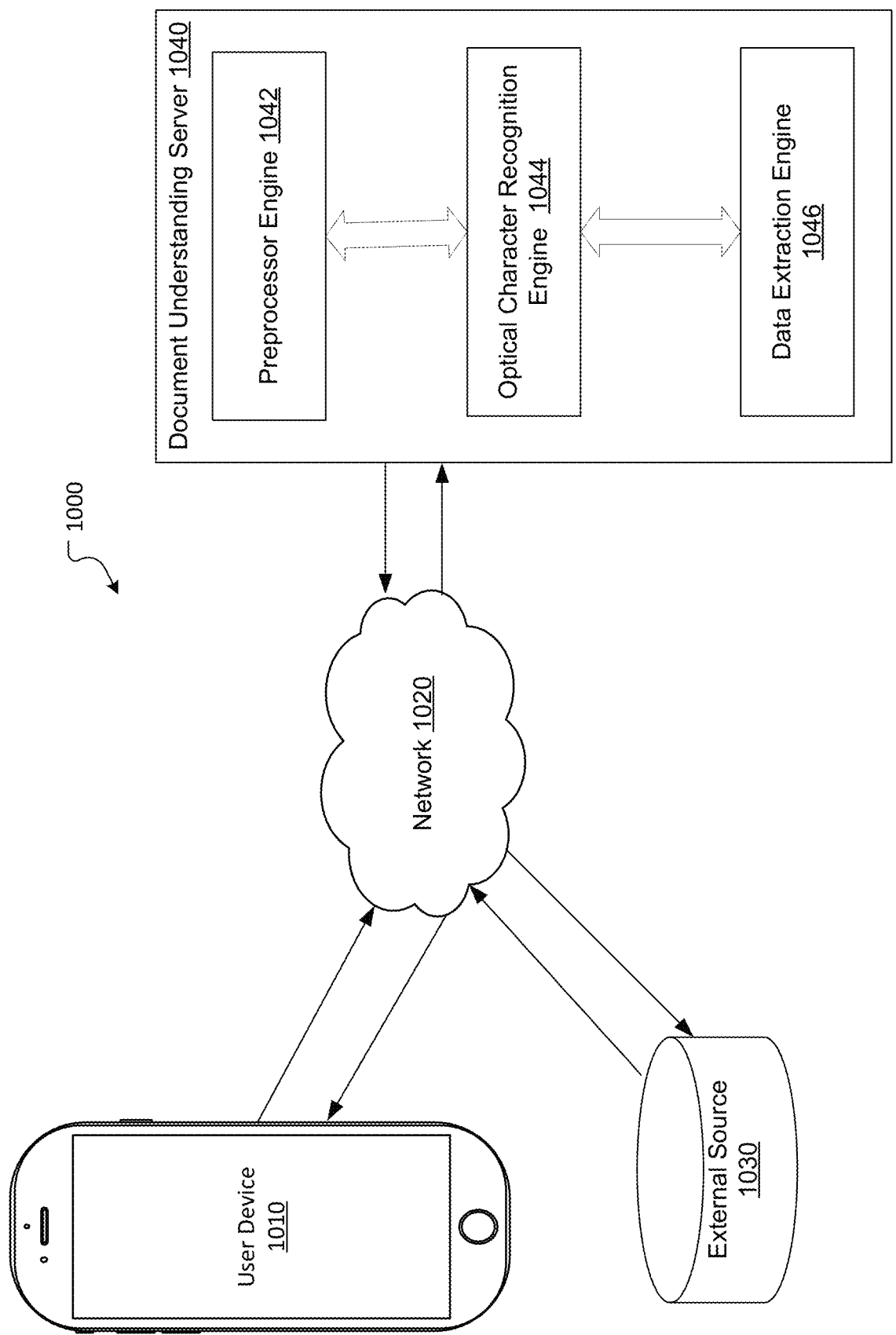
FIG. 10 illustrates an document understanding system according to an embodiment of the present disclosure.
Figure 11:
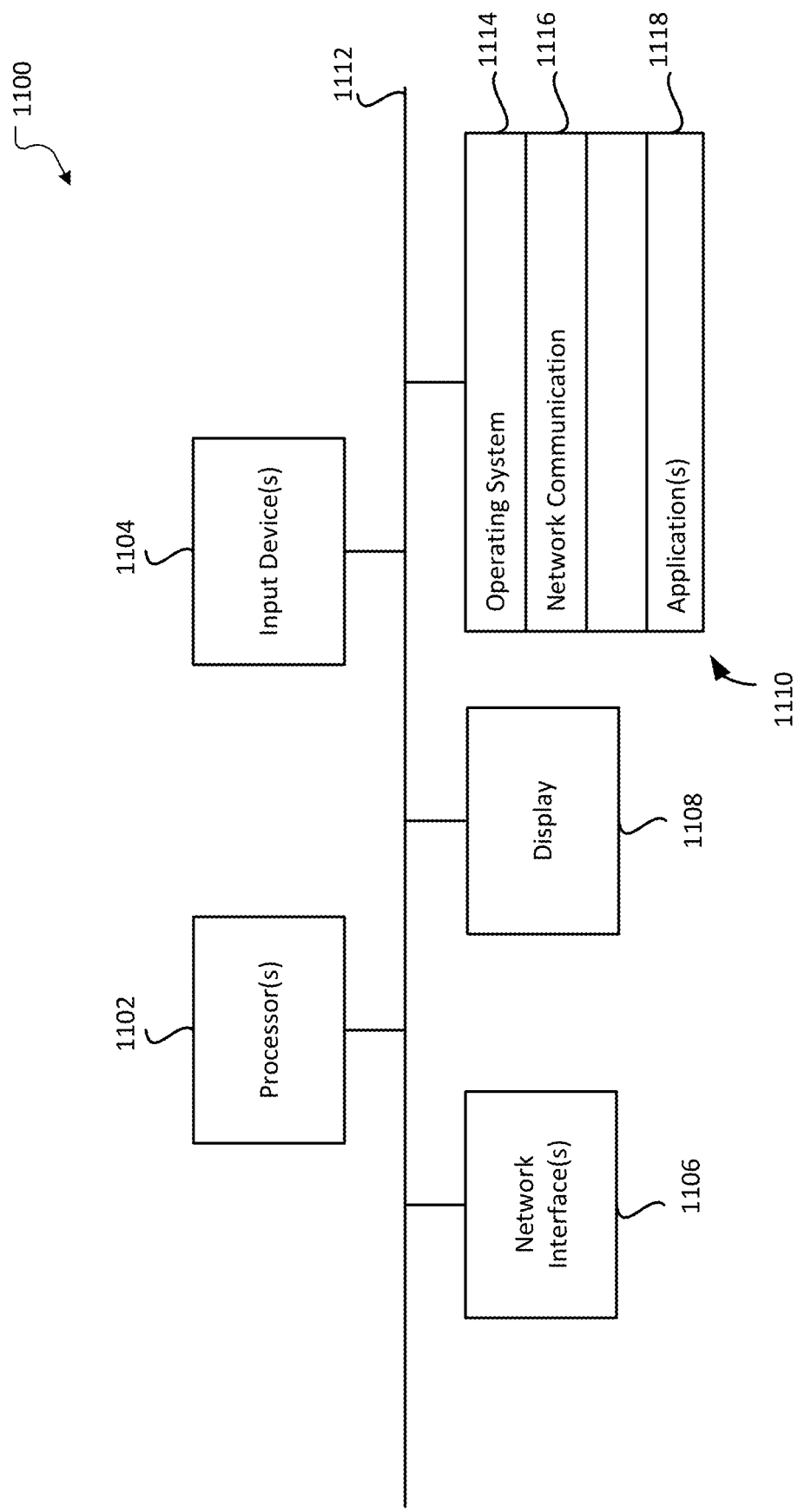
FIG. 11 illustrates a computing device according to an embodiment of the present disclosure.

FIG. 2 illustrates an example of a piece of content 200 from which data may be extracted using the document understanding process. In this example, the piece of content is a tax form and the structured data that can be extracted from the tax form using document understanding may include various words or sequences of alphanumeric characters (collectively "words") including a social security number (SSN) of a taxpayer, an employee identification number (EIN) of a taxpayer, an employer address, a wage amount and the other pieces of data shown in FIG. 2. It is desirable to be able to extract this structured data since that structured data may be used for downstream tax return preparation, tax planning or accounting functions. The piece of content shown in FIG. 2 is often received by the document understanding platform (examples of which are shown in FIGS. 10-11 and described below) as an image of the piece of content that may be captured by a camera of a computing device such as a smartphone. For a form-type piece of content, such as that shown in FIG. 2, the textual data that is annotated in FIG. 2 is organized in a specific way. For example, certain pieces of text are typically within a box that is in a known location in the piece of content. Furthermore, other data, such as a taxyear field in the example in FIG. 2, is known to appear either at the top or at the bottom of the image of the form. Also, in the example in FIG. 2, the employee's street address tends to appear in the same text box and text paragraph as the zip code of the employee. These hierarchical organizations of the text in the piece of content provide strong positional signals (spatial information) that can be input into a machine learning model/system that later extracts structured data from the piece of content.

Figure 3:
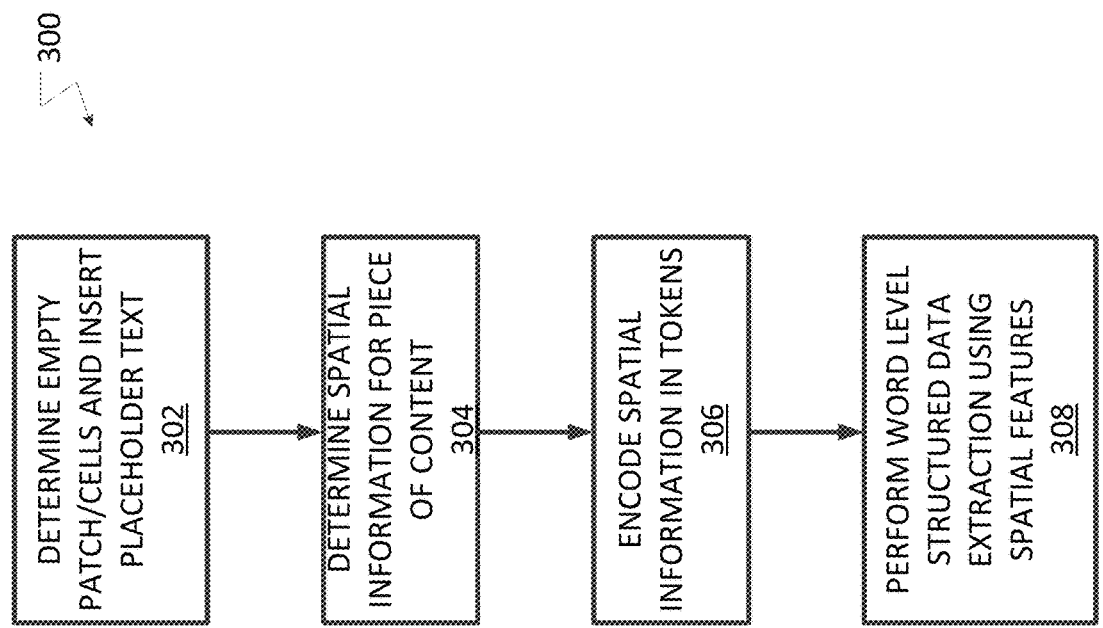
FIG. 3 illustrates a method for data extracting from the piece of content using spatial features.

FIG. 3 illustrates a method for data extraction 300 from the piece of content using spatial features in combination with text based features. The method 300 may be performed, for example, by the system and computing device shown in FIGS. 10-11 including a neural network that performs machine learning processes. For example, the method may be implemented as a series of computer instructions (including the machine learning methods and models) that are executed by a processor of the computer system (or neural network) so that the processor or neural network is configured to perform the method. The method may determine one or more empty patch or cells in the piece of content (302). The empty patches/cells in the piece of content may be different for each different user. The document understanding platform and method shown in FIG. 1 may utilize an optical character recognition process/commercial software that is able to detect these empty patch/cells and provide output data about the location of these empty patch/cells in the piece of content. For example, commercially available OCR engines like Abbyy® FineReader® of Google®'s Cloud Vision, Terreract4® extract word-level coordinates and text block hierarchies. To date, no system or method is known that uses the empty cells to train a machine learning model or, more specifically, train an information extraction model for extracting words from a form. The method uses the spatial hierarchies in the piece of content (the text blocks, sub-blocks, lines and raw word coordinates for example) to infer the neighbor of each word in a hierarchical manner (page→block→patch/cell→paragraph→line→individual words). These hierarchical spatial inferences improve the input text organization, especially in forms where the text ordering is not simply left-to-right and top-to-bottom and thus improves the data extraction from the piece of content.

Figure 4:
FIG. 4 illustrates an example of form in which empty cells are detected.

For example, FIG. 4 illustrates an example of a form 400 in which empty cells are detected and the piece of content is a W-2 tax form in which there are a number of cells for this particular tax form and for this particular user that are empty including an allocated tips, dependent care benefits and the other cells highlighted. Each empty patch/cell has an absence of text which is useful information to a data extraction process.

Figure 5:
FIG. 5 illustrates an example of the form in FIG. 4 with the detected empty cells filled with empty patch placeholder text.

Since in a majority of forms, many form fields (cells) may be optional, many fields may not be filled in. When a machine learning system and neural network models are trained on the inputs with the skipped table cells as shown in FIG. 4, the information extraction model is better able to extract the relevant structured data from the form. In particular, since the information extraction model is a sequence based probabilistic graphical model that learns the conditional probability between the stream of sequence of words, the labeled data sets generated with the inputs with missing texts from the empty fields cause the model to erroneously associate the sequential relation between the field before and after the skipped fields. As a result, the models cannot learn properly and thus predict incorrect context during the information extraction due to the skipped table cells. Therefore, the method may insert "empty patch placeholders" in each skipped table cell to obviate the skipped cell problem when training the information extraction models used later in the method so that the models learn that certain cells may contain no text. FIG. 5 illustrates an example of the form in FIG. 4 with the detected empty cells filled with empty patch placeholder text. In one embodiment, the empty patch placeholder text may be a unique string of characters that are unlikely to appear in any piece of content. For example, as shown in FIG. 5, the string of characters of the empty patch placeholder text may be ~***~ or ~ for smaller cells. The empty patch placeholder text for each empty cell may be inserted into the text stream generated by the OCR process.

Figure 6:
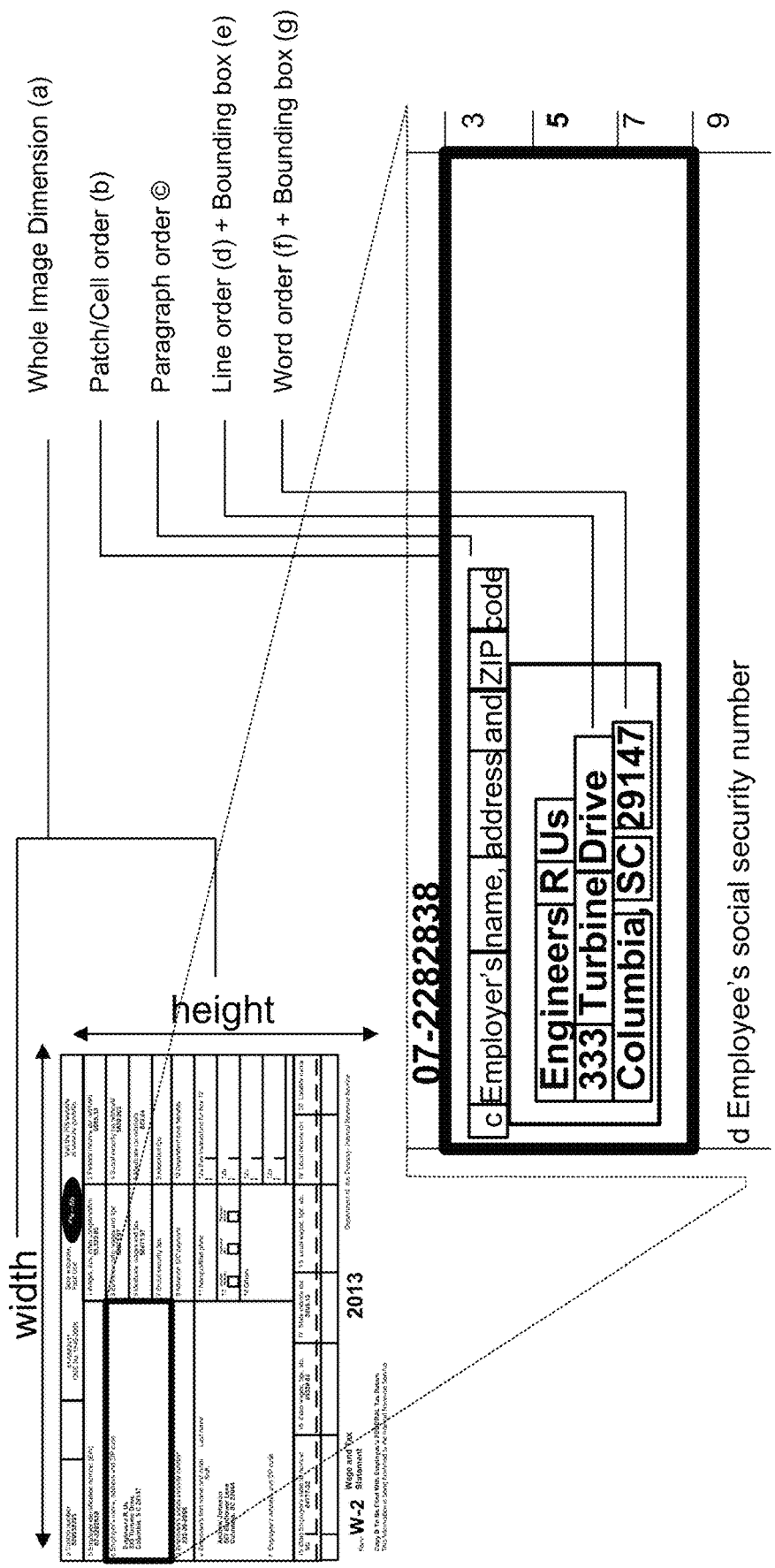
FIG. 6 illustrates the spatial information that may be extracted from a piece of content.

Returning to FIG. 3, the method 300 may also determine spatial information about each piece of content (304). FIG. 6 illustrates the spatial information that may be extracted from the same exemplary form shown in FIGS. 4-5. Similar to the empty patch detection, data stream output by the OCR process includes a number of pieces of hierarchical spatial information about the image. No system and method is known that harnesses this spatial information to train a machine learning model or more specifically train an information extraction model for extracting words from a form. In one embodiment, a whole image dimension (height and width), a patch/cell order for each cell in the image, a paragraph order for each paragraph in each cell, a line order and bounding box for each line in each paragraph in each cell and a word order and bounding box for each word in each line in each paragraph of the image may be extracted. The above information is spatial hierarchical information since each piece of information has a spatial relationship to each other piece of information (for example, the word information relates spatially to the line and paragraph that contains that word) about a location of the particular word. For purposes of illustration, each of these pieces of hierarchical spatial information may be assigned a letter designator (a)-(g) as shown in FIGS. 6 and 7A.

To input the hierarchical spatial information into the data extraction models, the method may encode that spatial information (306) into a token for each word using a TokenWithSpatial object. A typical token may include a word and an entity label for the word generated during the tokenization process. As shown in FIG. 7B, the novel TokenWithSpatial object may include the original word followed by a delimiter that separates each of the spatial characteristics associated with the area in which the word is location in the piece of content and separates the entity label associated with the word. In the example in FIG. 7B, the delimiter may be a section (§) symbol although the TokenWithSpatial object may use any other delimiter that is unlikely to appear in the form text. Thus, the hierarchical spatial information for each word is encoded into each token for each word. For example, the word "Engineers" in FIG. 6 may have spatial information about the form dimensions, the cell in which the word appears and the paragraph and line in which the word appears. The TokenWithSpatial object allows the token and the encoded hierarchical spatial information to be stored in a storage medium, including a disk, of the document understanding system shown in FIG. 10. The list of example spatial characteristics described above is merely illustrative and the system and method may use more or fewer or different spatial characteristics.

To derive features from the hierarchical spatial information, the method may use a Spatial FeatureGenerator object that turns the string attributes into numerical feature vectors. More precisely, the TokenWithSpatial encoding may encode k piece of spatial information following the input textual token in a sequential order separated by a special character as a delimiter. (In production, we specifically use a non-printable ASCII character as a separator to ensure that the original token is not corrupted by the encoding/decoding process). The SpatialFeatureGenerator has a method that loads the TokenWithSpatial encoded data from raw text, split them by the delimiter into a k+1 item list. The first item in the list is the original token and the remaining k items are the spatial information in the order specified by the encoding method. The SpatialFeatureGenerator can feed the first item to a traditional text based feature generator, and the remaining k items form a spatial feature vector/tensor (real-valued data on positive definite k dimensional orthogonal feature space). Thus, the SpatialFeatureGenerator's decoding reverses the encoding process. The spatial feature vector can be concatenated with traditional textual based feature vectors as an input to train a machine learning model.

The method 300 may then use these spatial features to perform word level data extraction (308) in the example in FIG. 3. The result of the data extraction is to extract information and/or structured data from the piece of content that may be used downstream for various purposes. The data extraction (308) may be performed using machine learning information extraction techniques using a neural net. For example, the data extraction may be performed using named entity recognition conditional random fields (NER-CRF) or using a bidirectional long short term memory-conditional random fields (biLSTM-CRF) method with the spatial encoding of features.

Figure 12:
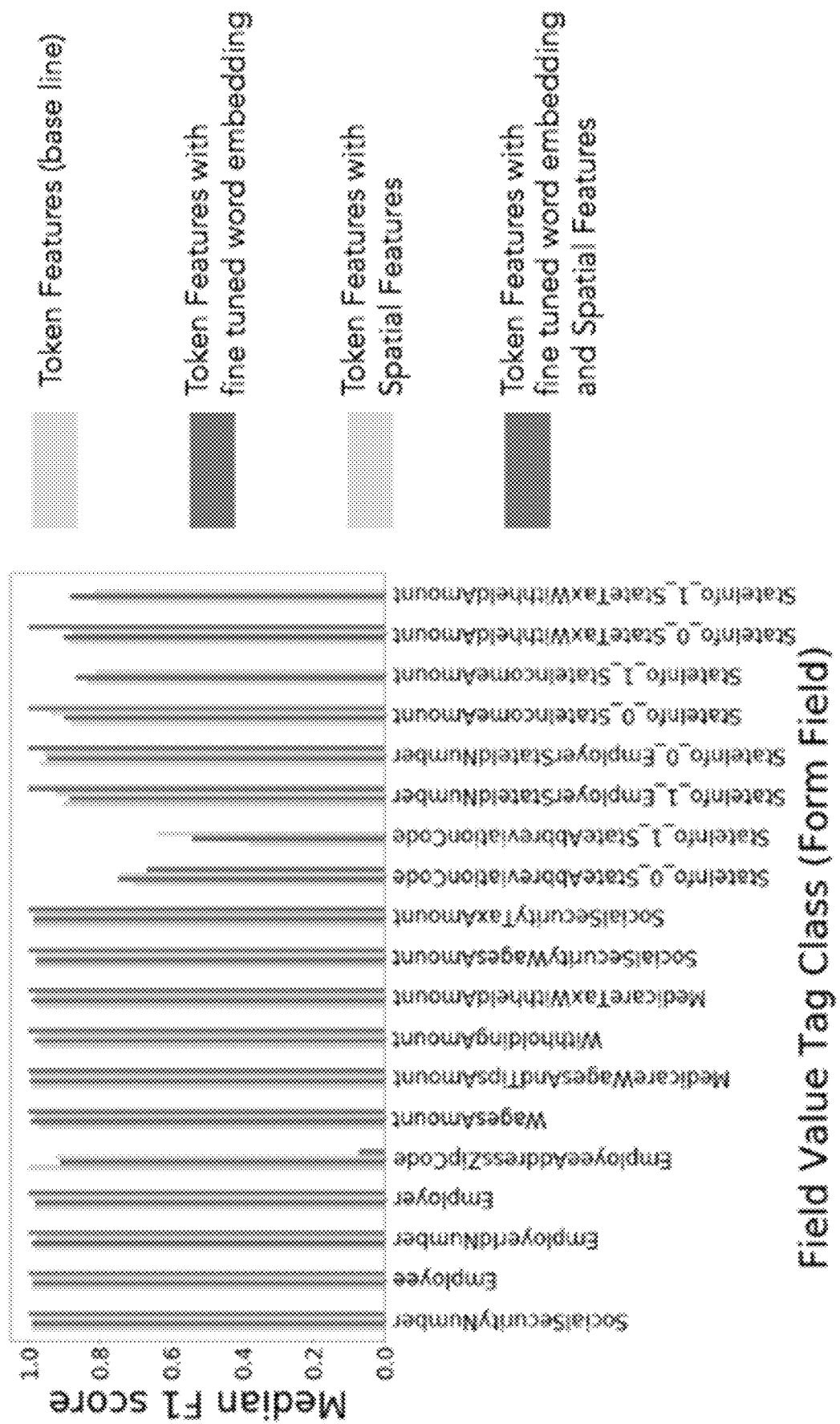
FIG. 12 is a chart showing the median F1 score for various token features, including token features with Spatial Features for a number of different fields in a form.

The above method may be used for an information extraction model for a tax form and the method with spatial envoding enhances the performance of the existing information extraction process. Specifically, the above method improved the machine learning performance by 5-10% when tested on synthetic data sets resulting in an improvement from 85% overall accuracy to 95% overall accuracy on highly used field classes. Further, the experimental results above were measured for the synthetic data set included synthetic images of W2 tax forms, examples of which appear in the above described figures. FIG. 12 is a chart showing the median F1 score for various token features, including token features with spatial features for a number of different fields in a form. FIG. 12 shows the overall better machine learning information extraction model performance when spatial features as described above are used as part of the data extraction process.

While the example provided is for a tax form and data extraction from that tax form, the above described method 300 with the spatial information has broader use. For example, the method described above may be used with an image of any piece of content in which it is desirable to be able to extract information or structured data from the piece of content. The above method (and the empty cell detection, spatial encoding, feature generation and feature concatenation) are machine learning model agnostic and these novel techniques can be applied to various machine learning problems outside of the information extraction domain where both the textual information and spatial position provide important cues.

Figure 8:
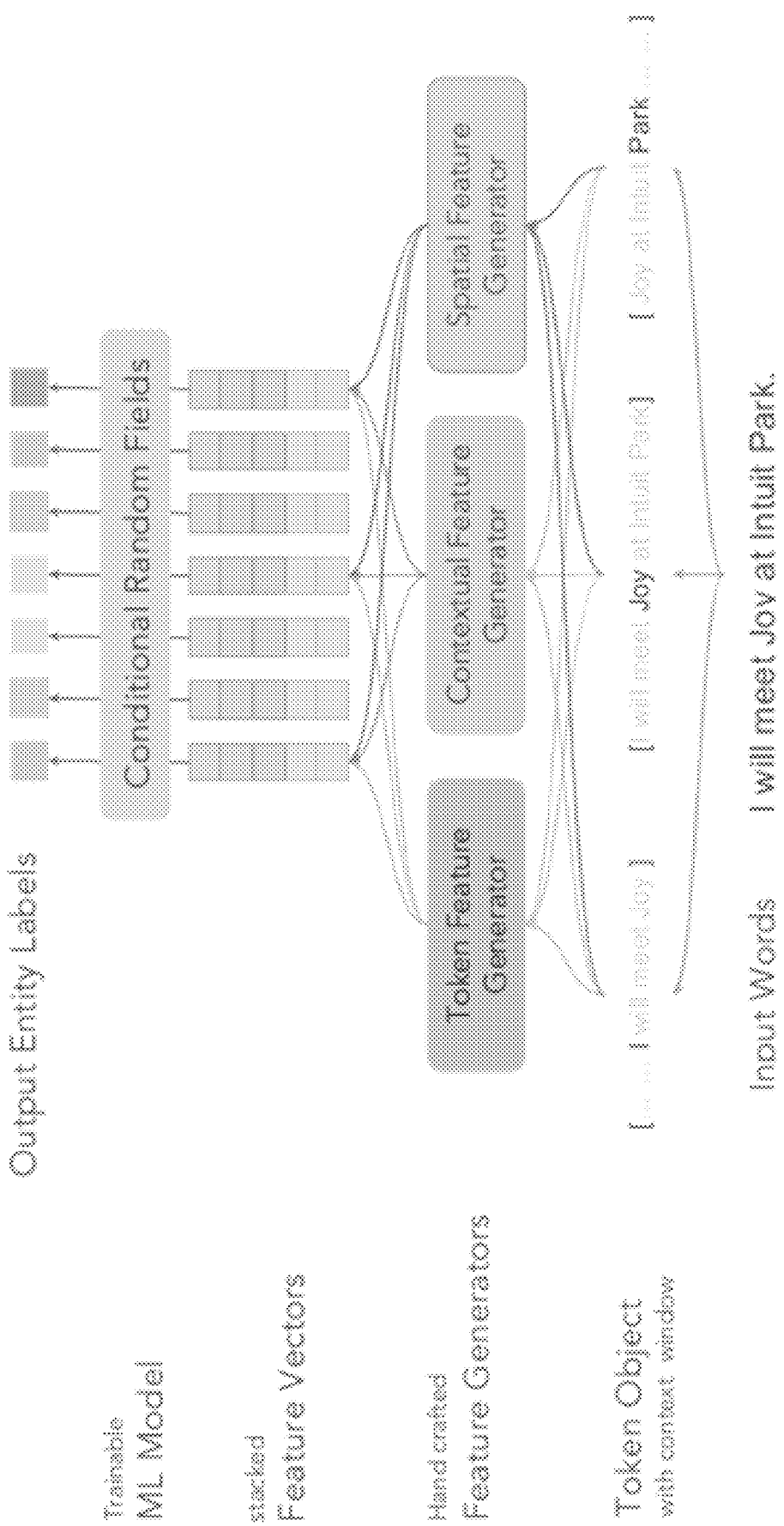
FIG. 8 illustrates named entity recognition conditional random fields machine learning with spatial features.
Figure 9:
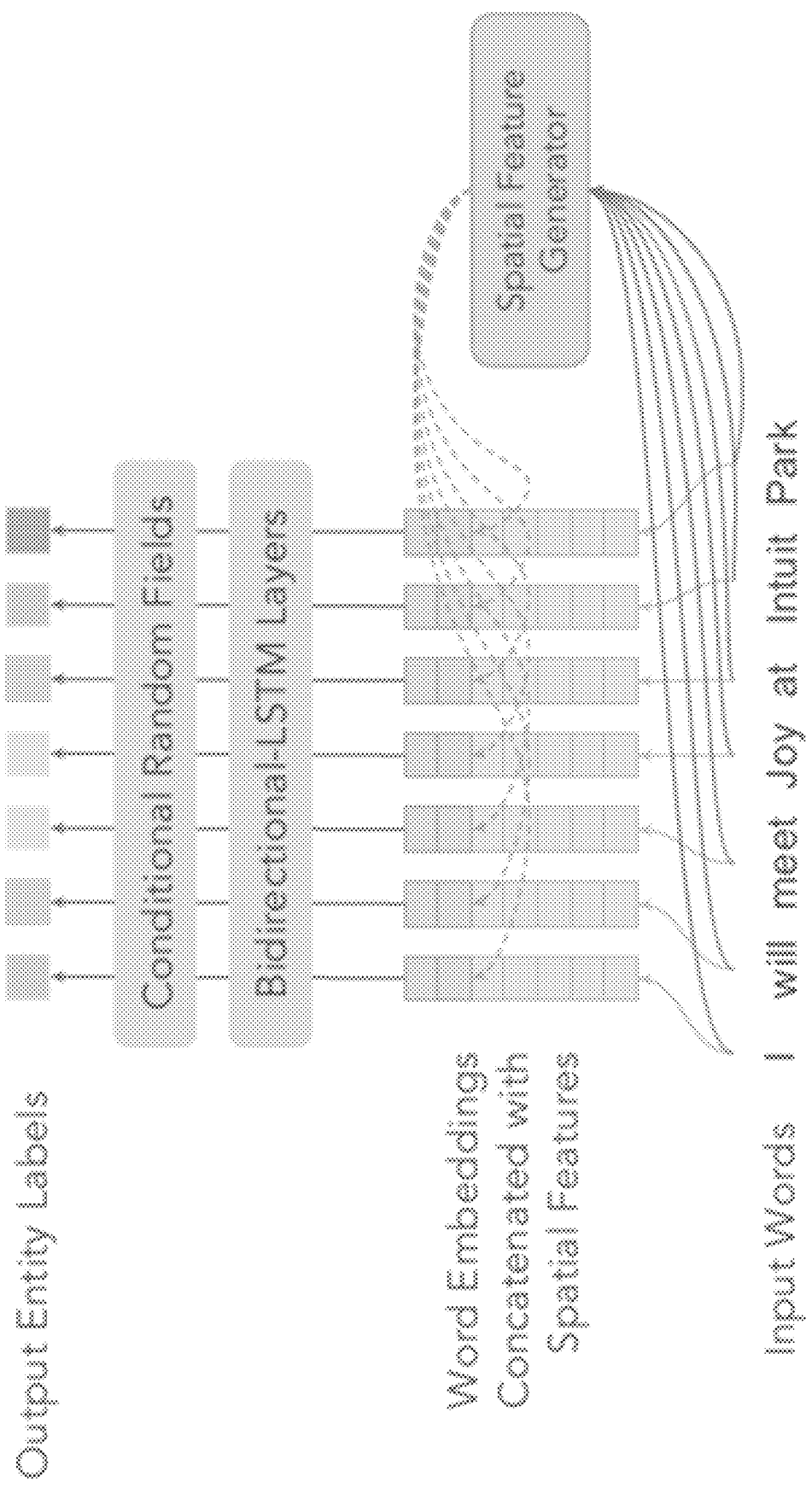
FIG. 9 illustrates a method for extracting structured data from the piece of content using the spatial data and bi-directional long short term memory and conditional random fields machine learning.

FIG. 8 illustrates named entity recognition conditional random fields machine learning with spatial features wherein the named entity recognition conditional random fields machine learning is an example of a machine learning model that may be executed using a neural network that is part of the system in FIG. 10 for data extraction. FIG. 9 illustrates a method for extracting structured data from the piece of content using the spatial data and bi-directional long short term memory and conditional random fields network that is also an example of a machine learning model that may be executed as part of the system in FIG. 10 for data extraction. As is known, each machine learning model is trained in a supervised manner, except that the spatial features are not included to better train the machine learning model to recognize empty cells in a form as described above. In FIGS. 8 and 9, the textual based token feature and contextual feature generators are included, but the spatial feature generator is used to generate additional spatial feature vectors that are input into the machine learning model (conditional random fields in FIG. 8 or BiLSTM-CRF in FIG. 9). Thus, the machine learning model with spatial information has a richer input description that provide useful signal for learning information extraction which results in better extraction accuracy.

FIG. 10 illustrates a document understanding system 1000 according to an embodiment of the present disclosure. The system 1000 may include elements such as at least one client 1010, an external source 1030 and a document understanding platform 1040 with a preprocessing engine 1042, optical character recognition engine 1044 and a data extraction engine 1046. Each of these elements 1042-1046 may perform the document understanding processes 102-108 shown in FIG. 1. Each of these elements may include one or more physical computing devices (e.g., which may be configured as shown in FIG. 11) and may also include a neural network that is part of the system in FIG. 10 and performs the machine learning methods and models. In some embodiments, one physical computing device may provide at least two of the elements, for example the preprocessing engine 1042, the optical character recognition engine 1044 and the data extraction engine 1046 may be provided by a single computing device. In some embodiments, client 1010 may be any device configured to provide access to services. For example, client 1010 may be a smartphone, personal computer, tablet, laptop computer, or other device. In some embodiments, the document understanding platform 1040 may be any device configured to host a service, such as a server or other device or group of devices. In some embodiments, client 1010 may be a service running on a device, and may consume other services as a client of those services (e.g., as a client of other service instances, virtual machines, and/or servers).

The elements may communicate with one another through at least one network 1020. Network 1020 may be the Internet and/or other public or private networks or combinations thereof. For example, in some embodiments, at least the external source 1030 and document understanding server 1040 (and its elements) may communicate with one another over secure channels (e.g., one or more TLS/SSL channels). In some embodiments, communication between at least some of the elements of system 1000 may be facilitated by one or more application programming interfaces (APIs). APIs of system 1000 may be proprietary and/or may be examples available to those of ordinary skill in the art such as Amazon Web Services (AWS) APIs or the like.

Specific examples of the processing performed by the elements of system 1000 in combination with one another are provided above. As described above, the client 1010 may attempt to access a service provided by the document understanding server 1040 that may include one or more different document understanding processes. As described above, the goal of the document understanding processes is extract data/text from an input piece of content wherein the input piece of content may be a receipt/invoice or a tax form that may be received from the client device 1010. In some embodiments, the client device 1010 may scan the piece of content, such as by using a camera device build into the client device 1010 and provide the scanned piece of content to the document understanding server 1040. The client 1010, external source 1030 and document understanding server 1040 are each depicted as single devices for ease of illustration, but those of ordinary skill in the art will appreciate that client 1010, external source 1030 and document understanding server 1040 may be embodied in different forms for different implementations. For example, any of client 1010, external source 1030 and document understanding server 1040 may include a plurality of devices, may be embodied in a single device or device cluster, and/or subsets thereof may be embodied in a single device or device cluster. In another example, a plurality of clients 1010 may be connected to network 1020. A single user may have multiple clients 1010, and/or there may be multiple users each having their own client(s) 1010. Client(s) 1010 may each be associated with a single process, a single user, or multiple users and/or processes. Furthermore, as noted above, network 1020 may be a single network or a combination of networks, which may or may not all use similar communication protocols and/or techniques.

FIG. 11 is a block diagram of an example computing device 1100 that may implement various features and processes as described herein. For example, computing device 1100 may function as client 1010, the external source 1030, the document understanding system 1040, or a portion or combination of any of these elements. In some embodiments, a single computing device 1100 or cluster of computing devices 1100 may provide each of the external source 1030, the document understanding system 1040, or a combination of two or more of these services. Computing device 1100 may be implemented on any electronic device that runs software applications derived from instructions, including without limitation personal computers, servers, smart phones, media players, electronic tablets, game consoles, email devices, etc. In some implementations, computing device 1100 may include one or more processors 1102, one or more input devices 1104, one or more network interfaces 1106, one or more display devices 1108, and one or more computer-readable mediums 1110. Each of these components may be coupled by bus 1112, and in some embodiments, these components may be distributed across multiple physical locations and coupled by a network.

Display device 1108 may be any known display technology, including but not limited to display devices using Liquid Crystal Display (LCD) or Light Emitting Diode (LED) technology. Processor(s) 1102 may use any known processor technology, including but not limited to graphics processors and multi-core processors. Input device 1104 may be any known input device technology, including but not limited to a keyboard (including a virtual keyboard), mouse, track ball, and touch-sensitive pad or display. Bus 1112 may be any known internal or external bus technology, including but not limited to ISA, EISA, PCI, PCI Express, NuBus, USB, Serial ATA or FireWire. Computer-readable medium 1110 may be any medium that participates in providing instructions to processor(s) 1102 for execution, including without limitation, non-volatile storage media (e.g., optical disks, magnetic disks, flash drives, etc.), or volatile media (e.g., SDRAM, ROM, etc.).

Computer-readable medium 1110 may include various instructions 1114 for implementing an operating system (e.g., Mac OS®, Windows®, Linux). The operating system may be multi-user, multiprocessing, multitasking, multi-threading, real-time, and the like. The operating system may perform basic tasks, including but not limited to: recognizing input from input device 1104; sending output to display device 1108; keeping track of files and directories on computer-readable medium 1110; controlling peripheral devices (e.g., disk drives, printers, etc.) which can be controlled directly or through an I/O controller; and managing traffic on bus 1112. Network communications instructions 1116 may establish and maintain network connections (e.g., software for implementing communication protocols, such as TCP/IP, HTTP, Ethernet, telephony, etc.).

Application instructions 1118 may include instructions that perform the various document understanding functions as described herein. The application instructions 1118 may vary depending on whether computing device 1400 is functioning as client 1010 or the document understanding system 1040, or a combination thereof. Thus, the application(s) 1118 may be an application that uses or implements the processes described herein and/or other processes. The processes may also be implemented in operating system 1114.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other, or by processes running on the same device and/or device cluster, with the processes having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As the foregoing description illustrates, the disclosed systems and methods may provide centralized authentication and authorization of clients 120 for accessing remote services based on a variety of policies. For example, the same central authority 130 may validate different clients 120 for different services based on different policies. The elements of the system (e.g., central authority 130, client 120, and/or service provider 150) may be policy-agnostic (e.g., the policy may specify any terms and may even change over time, but the authentication and authorization may be performed similarly for all policies). This may result in an efficient, secure, and flexible authentication and authorization solution. Moreover, this may result in a flattening of communications between client 120 and service provider 150 (e.g., because service provider 150 and client 120 may not be required to exchange several authentication and authorization messages between one another) while still allowing for trustworthy authentication and authorization.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method, comprising:
receiving, by a processor of a computer system, a text stream of data derived by an optical character recognition process from an image of a piece of content;
detecting, by the processor of the computer system, a plurality of pieces of spatial information associated with the piece of content, wherein the plurality of pieces of spatial information represents hierarchical spatial information indicative of relative locations of respective particular words within the piece of content, and wherein the hierarchical spatial information is further indicative of a location of an empty table cell, with missing text, following an associated non-empty table cell having a corresponding particular word;
encoding, by the processor of the computer system, each of the plurality of pieces of spatial information into a respective token associated with a respective particular word, each respective token containing the respective particular word, or a placeholder text for the missing text of the empty table cell, and associated hierarchical spatial information, each piece of the associated hierarchical spatial information being separated by a delimiter;
generating, by the processor of the computer system, a plurality of numerical spatial features based on the encoded plurality of pieces of spatial information, wherein the plurality of numerical spatial features includes a plurality of numerical values representing the respective particular words and the empty table cell;
inputting, by the processor of the computer system, the plurality of numerical spatial features into a machine learning model; and
performing, by the processor of the computer system, the machine learning model using the plurality of numerical spatial features.

2. The method of claim 1, wherein detecting the plurality of pieces of spatial information further comprises detecting, by the processor of the computer system, the empty table cell in the piece of content.

3. The method of claim 2, further comprising inserting, by the processor of the computer system, the placeholder text into the detected empty table cell in place of the missing text.

4. The method of claim 1, wherein performing the machine learning model further comprises performing an information extraction machine learning process to extract data from the piece of content.

5. The method of claim 4, wherein performing an information extraction machine learning process further comprises receiving another text stream from the optical character recognition process of a form and extracting words from the form using the information extraction machine learning process.

6. The method of claim 5, wherein performing an information extraction machine learning process further comprises using a conditional random field machine learning model to extract data from the form.

7. The method of claim 5, wherein performing an information extraction machine learning process further comprises using a bidirectional long short term memory and conditional random field machine learning models to extract data from the form.

8. The method of claim 1, wherein the hierarchical spatial information further comprises spatial information about a page of the piece of content, spatial information about a table cell in the page of the piece of content, spatial information about a paragraph in the table cell of the piece of content, spatial information about a line in the paragraph of the piece of content and spatial information about a word in the line of the piece of content.

9. The method of claim 1, wherein the encoding further comprises, for each respective particular word, generating a TokenWithSpatial object having the respective particular word, at least one of the plurality of pieces of spatial information, and a respective entity label for the respective particular word.

10. An apparatus, comprising:
a computer based neural network;
a computer, connected to the computer based neural network, having a processor and instructions configured to:
receive a text stream of data derived by an optical character recognition process from an image of a piece of content;
detect a plurality of pieces of spatial information associated with the piece of content, wherein the plurality of pieces of spatial information represents hierarchical spatial information indicative of relative locations of respective particular words within the piece of content, and wherein the of hierarchical spatial information is further indicative of a location of an empty table cell, with a missing text, following an associated non-empty table cell having a corresponding particular word;
encode each of the plurality of pieces of spatial information into a respective token associated with a respective particular word, each respective token containing the respective particular word, or a placeholder text for the missing text of the empty table cell, and associated hierarchical spatial information, each piece of the associated hierarchical spatial information being separated by a delimiter;
generate a plurality of numerical spatial features based on the encoded plurality of pieces of spatial information, wherein the plurality of numerical spatial features includes a plurality of numerical values representing the respective particular words and the empty table cell; and
input the plurality of numerical spatial features into a machine learning model; and
wherein the computer based neural network performs a machine learning model using the plurality of numerical spatial features.

11. The apparatus of claim 10, wherein the processor is further configured to detect the empty table cell in the piece of content.

12. The apparatus of claim 11, wherein the processor is further configured to insert the placeholder text into the detected empty table cell in place of the missing text.

13. The apparatus of claim 10, wherein the neural network performs an information extraction machine learning process to extract data from the piece of content.

14. The apparatus of claim 13, wherein the neural network extracts word data from a form using the information extraction machine learning process.

15. The apparatus of claim 14, wherein the neural network uses a conditional random field machine learning model to extract data from the form.

16. The apparatus of claim 14, wherein the neural network uses a bidirectional long short term memory and conditional random field machine learning models to extract data from the form.

17. The apparatus of claim 10, wherein the hierarchical spatial information further comprises spatial information about a page of the piece of content, spatial information about a table cell in the page of the piece of content, spatial information about a paragraph in the table cell of the piece of content, spatial information about a line in the paragraph of the piece of content and spatial information about a word in the line of the piece of content.

18. The apparatus of claim 10, wherein the processor is further configured to generate, for each respective particular word, a TokenWithSpatial object having the respective particular word, at least one of the plurality of pieces of spatial information, and a respective entity label for the respective particular word.

\* \* \* \* \*